Figure 1:
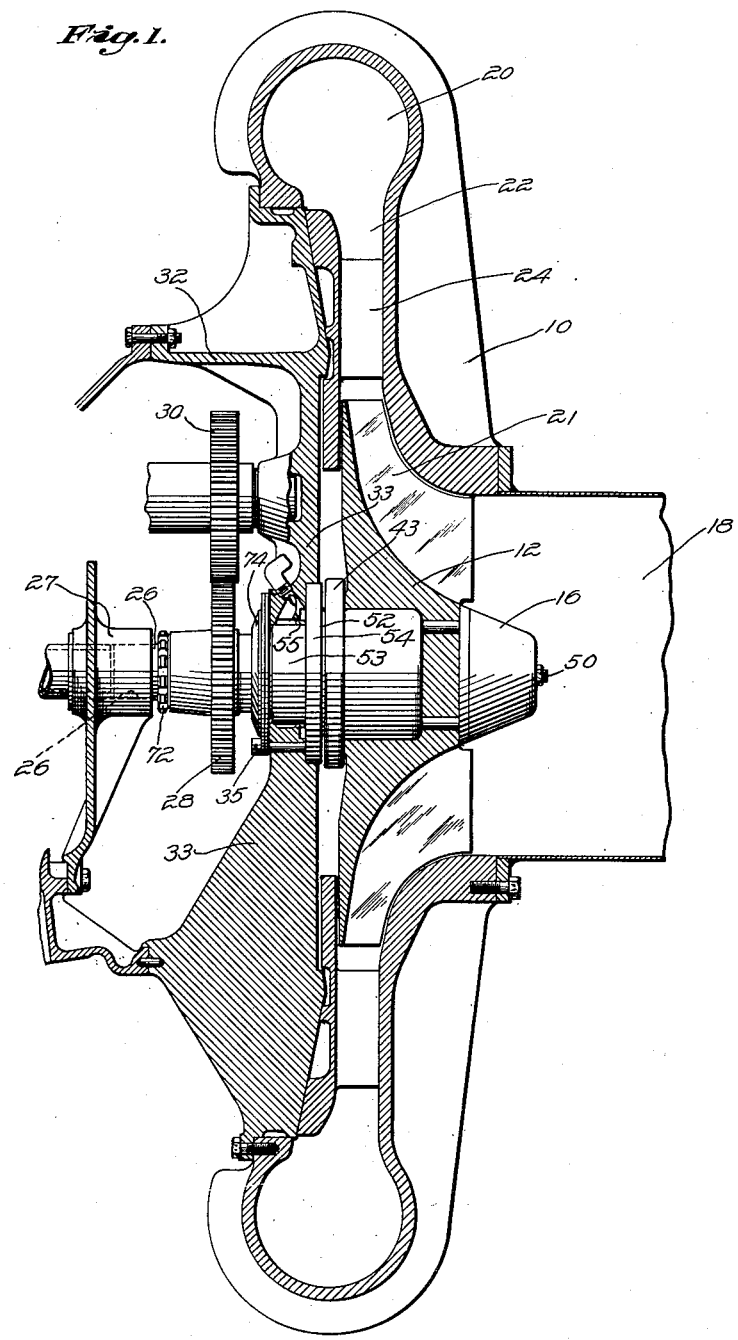

Jan. 8, 1952          B. H. BROWN          2,581,834
                     IMPELLER MOUNTING
Filed March 22, 1946                    2 SHEETS—SHEET 1

Inventor
B. H. Brown
by H. Hume Mathews
Attorney

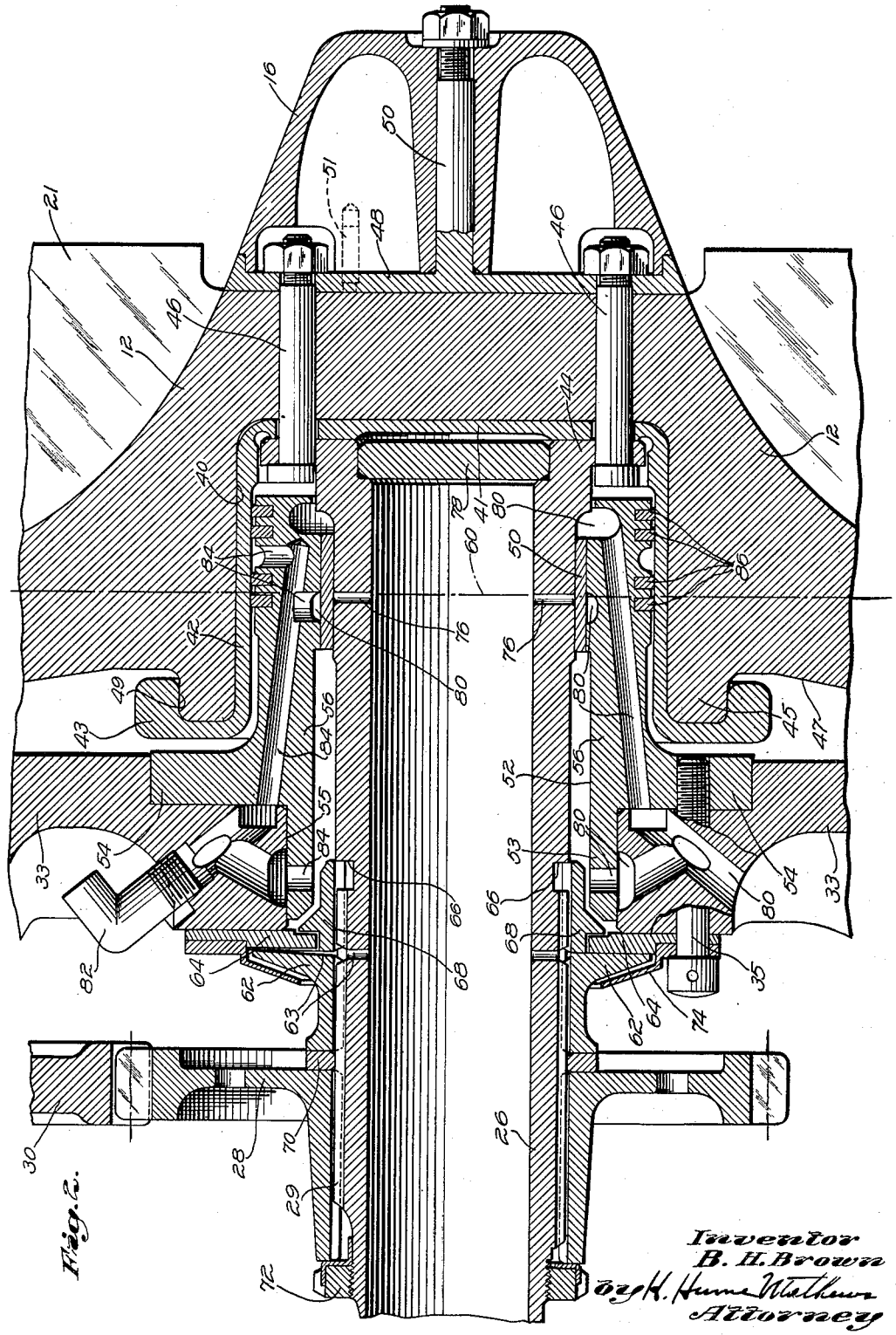

Patented Jan. 8, 1952

2,581,834

UNITED STATES PATENT OFFICE 2,581,834

IMPELLER MOUNTING

Bertrand H. Brown, Hartford, Conn., assignor to United Aircraft Corporation, East Hartford, Conn., a corporation of Delaware Application March 22, 1946, Serial No. 656,386

8 Claims. (Cl. 230—134)

This invention relates to impeller mountings and particularly to a mounting for a centrifugal type impeller for an aircraft engine supercharger.

An object of the invention is to provide an improved mounting structure for impellers.

A further object is to provide an improved mounting for impellers in which a plane passing through the center of the mass of the impeller assembly normal to the axis of rotation thereof passes through the bearing upon which the impeller rotates.

Another object is to provide a centrifugal impeller which has an unobstructed streamlined air entrance passage and which is rotated and supported from one side thereof by a shaft and bearing having a high shaft critical speed and low bearing surface speeds, said bearing being approximately centered axially with respect to the center of mass of the impeller assembly.

Other objects and advantages will be apparent from the specification and claims, and from the accompanying drawing which illustrates what is now considered to be a preferred embodiment of the invention.

In the drawings, Fig. 1 is a sectional view, with some parts shown in full, of an aircraft engine supercharger having a centrifugal impeller mounted according to this invention.

Fig. 2 is an enlarged sectional view of the mounting structure for the impeller of Fig. 1.

Referring to the drawing, Fig. 1 shows a supercharger 10, comprising a centrifugal type impeller 12 having radial vanes 21 thereon and having a streamlined hub or cap 16 rotatable therewith. In operation, the impeller is rapidly rotated to pump fluid, such as engine intake air or fuel air mixture, from inlet conduit 18 to an annular collector chamber 20. Fluid leaving impeller vanes 21 at high velocity is slowed down and increased in static pressure by diffuser section 22, having fixed vanes 24 therein.

Impeller 12 is driven from one side thereof by a shaft 26, which in turn is driven by the engine (not shown) in a known manner through a speed increasing gear train which includes a jack shaft gear 30 and an impeller shaft gear 28.

As best shown in Fig. 2, the impeller is recessed in its web or central section, on the side opposite air inlet 18, to form a blind hole or recess 40 within which a retainer cup 42 is closely fitted. Cup 42 is provided with a U-shaped annular edge including a thickened lip portion 43. An annular flange or boss 45 protrudes from the back face 47 of the impeller and fits snugly within the bight portion of the cup edge. Cup lip 43 is dimensioned on its inner periphery to form a press or force fit at 49 with the outer periphery of impeller flange 45, thereby retaining the cup in recess 40, locating it concentrically with respect to the axis of rotation of the impeller and forming a driving fit between the cup and the impeller. The cup is preferably made of steel, or similar material, while the impeller is usually made of a magnesium or aluminum material. Consequently the impeller tends to grow or deform radially during rotation at a greater rate than the lip or band 43 on the cup. Thus the band or lip inhibits the growth rate or strain of the impeller hub during operation, thereby acting as a reinforcement reducing stress on the impeller hub material.

The inner end of shaft 26 is provided with an outturned annular flange 44 which is bolted against bottom wall 41 of the cup 42, by bolts 46. These bolts pass through the web section of the impeller and clamp the shaft 26, cup 42 and impeller 12 together, thereby forming a driving connection between both the shaft and the impeller and the shaft and the cup. They also serve to secure the hub cap mounting plate 48 to the front side of the impeller. Plate 48 has a bolt 50 projecting coaxially therefrom for clamping the streamlined hub cap 16 to plate 48. A pin 51 prevents relative rotation between hub cap 16 and plate 48.

Shaft 26 is rotated in a bearing 50 by gear 28, splined to the shaft at 29. Bearing 50 is mounted within a housing 52, which has an annular base portion 54 bolted at 35 within a recess in a fixed partition or wall 33 of the case or frame 32. An extension 53 projects from one side of the housing base into an opening 55 in wall 33, around shaft 26. Base portion 54 and the extension 53 locate and rigidly support housing 52 with respect to wall 33. A pedestal or column 56 integral with base portion 54 extends into cup 42, coaxially with shaft 26. Bearing 50 is pressed or pinned within the end of housing 52 and the arrangement is such that shaft 26 and impeller 12 bolted thereto are rotatably supported in bearing 50 by wall 33 at a point within recess 40 and cup 42.

Preferably, bearing 50 is so located that the center of mass of the rotatable impeller assembly (impeller 12, cap 16, cup 42, plate 48 and bolts 46, 50) lies in a plane normal to the axis of rotation and passing substantially through the center of the bearing, as indicated by the broken line 60. Thus, the impeller assembly is in effect rotatably supported at a point in a plane passing through the center of mass of said assembly normal to the axis of rotation thereof.

It will be seen that the protrusion of shaft 26 from bearing 50 is extremely small; the construction is such that the first natural period of vibration of the impeller assembly and mounting structure is substantially that determined by the stiffness of housing 52, which forms the bearing support. The housing has a relatively large outer diameter, thereby providing a high stiffness and thus a high first natural period. Consequently an impeller assembly mounted in accordance with this invention has a first natural period, or critical speed, which is considerably higher than that inherent in conventional impeller mounting arrangements of the same shaft diameter. This enables the impeller to be operated with safety at higher speeds than would be possible with the conventional arrangements. At the same time bearing 50 may be made small enough to yield sufficiently low bearing surface speeds. Further, the vibration characteristics of the impeller assembly are substantially determined by the mounting comprising bearing 50 and housing 52; the position of the other bearing or bearings for shaft 26 may therefore be selected at will, without materially affecting operational characteristics. In the form of the invention shown, a single bearing 27 is provided for the left hand end of shaft 26, opposite the mounting 50, 52.

To absorb thrust forces on the impeller, which tend during operation to move the assembly toward the air inlet (to the right as viewed in Fig. 2), a thrust bearing is provided, which comprises thrust rings 62, 68 and a thrust washer 64. Washer 64 is bolted to the case wall 33 by bolts 35, the same bolts that secure housing 52 to the wall; thus radial movements of shaft 26 are resisted by case 32 through wall 33 and housing 52, while axial movements of shaft 26 are resisted by case 32 through wall 33 and thrust washer 64. Thrust rings 62, 68 are locked axially with respect to shaft 26 by a nut 72, which holds the assembly consisting of gear 28, a spacer ring 70 and thrust rings 62, 68 in abutment with a shoulder 66 on the outer periphery of the shaft. Gear 28 and thrust rings 62, 68 are also splined to the shaft for rotation therewith. An oil splash ring or guard ring 74, spaced from and covering the outer side of thrust ring 62 is secured to wall 33 by bolts 35.

Bearing 50 is lubricated by oil fed through oil holes 76 from the interior of shaft 26, which is supplied with oil under pressure in a conventional manner. Thrust bearing 62, 64 is lubricated by oil supplied from shaft 26 through tapering passages 63. The impeller end of the shaft is plugged at 78. Oil flowing past the bearing 50 is drained away to a sump (not shown) by passages 80. These passages are vented to atmosphere by fitting 82 and ports 84. To prevent oil from leaking into the engine intake air, oil seal rings 86, carried in ring grooves in the outer periphery of pedestal 56, bear against the inner surface of cup 42.

While the invention is shown in the embodiment of the drawing as applied to a centrifugal impeller of the radial flow type it is to be understood that it is not limited to any particular type of impeller or to the specific embodiment herein illustrated and described, but may be used in other ways without departure from its spirit as defined by the following claims.

I claim:

1. A rotatable assembly including a vaned fluid impeller having an unobstructed inlet and a retaining cup on the other side thereof, a driving shaft fixed to said impeller and extending into said cup, and a bearing within said cup for said shaft having substantially equal bearing surface areas located respectively on opposite sides of a plane passing substantially through the center of mass of the rotatable assembly normal to the axis of rotation thereof.

2. A centrifugal impeller having a recessed web section, a cup fitted within said recess, an annular flange on said impeller around said cup, and a band surrounding said flange and connected to said cup, said band having a tight fit with said flange for forming a driving connection therebetween.

3. An impeller according to claim 2, in which said band is of a material and configuration such that the band tends to have a smaller rate of radial growth upon rotation thereof than said impeller flange.

4. Mounting and driving means for a vaned rotatable impeller comprising, a casing, a wall member in said casing, a driving shaft extending through an opening in said wall, a vaned rotatable impeller having a recessed web section and an annular flange projecting therefrom, means fixing said impeller to an end of said shaft on one side of said wall including a cup fitted within said recessed web section having a band surrounding said flange, said band having a tight fit with said flange for forming a driving connection therebetween, a tubular housing for resisting radial movements of said shaft and said rotatable impeller relative to said wall, said housing bridging the gap between said rotatable impeller and said wall and a bearing means in said tubular housing for said shaft.

5. Mounting and driving means according to claim 4, including means on the side of said wall opposite said rotatable member for resisting axial movements of said shaft and said rotatable member.

6. Mounting and driving means for a radial flow impeller having an axial inlet, comprising, a recess in said impeller on the side opposite said inlet, a cup member within said recess for mounting said impeller, a shaft having one end thereof extending into said cup in radially spaced relation thereto, means accessible from the inlet side of said impeller for securing said shaft and said cup to said impeller, supporting means extending into the space between said cup member and said shaft, and a bearing sleeve member on said supporting means rotatably engaging said shaft.

7. A structure according to claim 6, including means for feeding a lubricant from the interior of said shaft to the bearing surface between said shaft and said bearing member, and oil seal means between said supporting means and said cup.

8. In combination, a driving shaft, an impeller having a recessed web section, a cup fitted within said recessed web section, an annular flange on said impeller around said cup, a band surrounding said flange and connected to said cup, said band having a tight fit with said flange, said driving shaft extending into said cup and being drivingly connected thereto and a bearing means for said driving shaft.

BERTRAND H. BROWN.

REFERENCES CITED

The following references are of record in the file of this patent:

UNITED STATES PATENTS

| Number | Name | Date |
|---|---|---|
| 427,060 | Edwards et al. | May 6, 1890 |
| 1,838,799 | Welch | Dec. 29, 1931 |
| 2,028,360 | Sprink | Jan. 21, 1936 |
| 2,121,299 | Peters | June 21, 1938 |
| 2,335,508 | Gustaffsson et al. | Nov. 30, 1943 |
| 2,399,072 | Thompson | Apr. 23, 1946 |
| 2,401,206 | Van Rijswijk | May 28, 1946 |
| 2,473,061 | Jacobsen | June 14, 1949 |

FOREIGN PATENTS

| Number | Country | Date |
|---|---|---|
| 157,480 | Great Britain | Jan. 1, 1921 |